(12) United States Patent
Rys et al.

(10) Patent No.: US 11,100,096 B2
(45) Date of Patent: Aug. 24, 2021

(54) VIDEO CONTENT SEARCH USING CAPTIONING DATA

(71) Applicant: AT&T INTELLECTUAL PROPERTY I, L.P., Atlanta, GA (US)

(72) Inventors: Stephen A. Rys, Austin, TX (US); Dale W. Malik, Marietta, GA (US); Nadia Morris, San Francisco, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 90 days.

(21) Appl. No.: 16/407,388

(22) Filed: May 9, 2019

(65) Prior Publication Data

US 2019/0266150 A1    Aug. 29, 2019

Related U.S. Application Data

(63) Continuation of application No. 14/061,172, filed on Oct. 23, 2013, now Pat. No. 10,331,661.

(51) Int. Cl.
*G06F 16/24* (2019.01)
*H04N 21/231* (2011.01)
(Continued)

(52) U.S. Cl.
CPC ............. *G06F 16/24* (2019.01); *G06F 16/00* (2019.01); *G06F 16/745* (2019.01);
(Continued)

(58) Field of Classification Search
CPC ........ G06F 16/24; G06F 16/745; G06F 16/00; G11B 27/105; G11B 27/28;
(Continued)

(56) References Cited

U.S. PATENT DOCUMENTS 5,703,655 A * 12/1997 Corey ................. G11B 27/105
                                            348/468
7,460,149 B1 * 12/2008 Donovan ............. G11B 27/105
                                            348/143
(Continued)

FOREIGN PATENT DOCUMENTS

EP            2405369 A1    1/2012
KR       20030057924 A     7/2003

OTHER PUBLICATIONS

International Search Report and Written Opinion for International Application No. PCT/US2014/056746, dated Dec. 1, 2014, 12 pages.

*Primary Examiner* — Hosain T Alam
*Assistant Examiner* — Robert F May
(74) *Attorney, Agent, or Firm* — Guntin & Gust, PLC; Mark Wilinski (57) ABSTRACT

A method includes receiving, at an analysis server from a user device, a keyword associated with content of interest. The method includes retrieving, at the analysis server from a database, searchable tag data for first searchable tags in the database. Each searchable tag of the searchable tags corresponds to a segment of stored media content. The stored media content is associated with the user device. The first searchable tags pertain to the keyword. The searchable tag data includes an initial relevancy score and a corresponding aging factor for each first searchable tag of the first searchable tags. The method also includes generating, at the analysis server, a list of media content segments based on the searchable tag data and sending the list from the analysis
(Continued)

server to the user device. The list is ordered based on the initial relevancy scores modified by the corresponding aging factors.

20 Claims, 4 Drawing Sheets (51) Int. Cl.
*H04N 21/235* (2011.01)
*H04N 21/278* (2011.01)
*H04N 21/432* (2011.01)
*H04N 21/433* (2011.01)
*H04N 21/435* (2011.01)
*H04N 21/4722* (2011.01)
*H04N 21/482* (2011.01)
*H04N 21/81* (2011.01)
*H04N 21/8405* (2011.01)
*H04N 21/845* (2011.01)
*G11B 27/10* (2006.01)
*G11B 27/28* (2006.01)
*G06F 16/00* (2019.01)
*G06F 16/74* (2019.01)
*H04N 21/2668* (2011.01)

(52) U.S. Cl.
CPC ............ *G11B 27/105* (2013.01); *G11B 27/28* (2013.01); *H04N 21/235* (2013.01); *H04N 21/23109* (2013.01); *H04N 21/278* (2013.01); *H04N 21/435* (2013.01); *H04N 21/4325* (2013.01); *H04N 21/4332* (2013.01); *H04N 21/4722* (2013.01); *H04N 21/4828* (2013.01); *H04N 21/8133* (2013.01); *H04N 21/8405* (2013.01); *H04N 21/8456* (2013.01); *H04N 21/2668* (2013.01); *H04N 21/812* (2013.01)

(58) Field of Classification Search
CPC ........... H04N 21/23109; H04N 21/235; H04N 21/278; H04N 21/4325; H04N 21/4332; H04N 21/435; H04N 21/4722; H04N 21/4828; H04N 21/8133; H04N 21/8405; H04N 21/8456; H04N 21/2668; H04N 21/812
USPC .......................................................... 707/758
See application file for complete search history.

(56) References Cited

U.S. PATENT DOCUMENTS

| | | | |
|---|---|---|---|
| 8,006,268 B2 | 8/2011 | Sloo | |
| 8,041,716 B2 | 10/2011 | Daigle et al. | |
| 8,151,298 B2 | 4/2012 | Begeja et al. | |
| 8,171,509 B1* | 5/2012 | Girouard | H04N 21/812 725/32 |
| 8,321,466 B2 | 11/2012 | Black et al. | |
| 8,332,530 B2 | 12/2012 | Wei et al. | |
| 8,375,405 B2 | 2/2013 | Morris et al. | |
| 8,424,052 B2 | 4/2013 | Abed | |
| 8,494,343 B2 | 7/2013 | Card, II | |
| 8,539,086 B2* | 9/2013 | Mallet | G06F 16/9535 709/227 |
| 8,788,487 B2* | 7/2014 | Stout | G06Q 10/101 707/722 |
| 8,832,088 B1* | 9/2014 | Chen | G06Q 30/00 707/723 |
| 9,081,857 B1* | 7/2015 | Huet | G06F 16/951 |
| 2002/0059608 A1 | 5/2002 | Turner | |
| 2004/0040041 A1 | 2/2004 | Crawford | |
| 2004/0078807 A1 | 4/2004 | Fries et al. | |
| 2004/0255336 A1 | 12/2004 | Logan et al. | |
| 2006/0013557 A1* | 1/2006 | Poslinski | H04N 5/783 386/250 |
| 2007/0154171 A1 | 7/2007 | Elcock et al. | |
| 2007/0244902 A1* | 10/2007 | Seide | G06F 16/78 |
| 2007/0277205 A1 | 11/2007 | Grannan | |
| 2008/0178219 A1 | 7/2008 | Grannan | |
| 2009/0164460 A1* | 6/2009 | Jung | G06F 16/7844 |
| 2010/0145938 A1 | 6/2010 | Boetje et al. | |
| 2011/0099195 A1* | 4/2011 | Patwardhan | G06F 16/738 707/769 |
| 2011/0161316 A1* | 6/2011 | Jeh | G06F 16/2358 707/727 |
| 2011/0179445 A1 | 7/2011 | Brown et al. | |
| 2011/0258188 A1 | 10/2011 | Abdalmageed et al. | |
| 2012/0023055 A1 | 1/2012 | Degaeff | |
| 2012/0047534 A1 | 2/2012 | Gharachorloo et al. | |
| 2012/0117057 A1 | 5/2012 | Adimatyam et al. | |
| 2013/0081078 A1 | 3/2013 | Del Sordo et al. | |
| 2013/0108242 A1 | 5/2013 | Oliver | |
| 2013/0167180 A1 | 6/2013 | Georgescu | |
| 2013/0282747 A1* | 10/2013 | Cheng | G06F 16/78 707/758 |

\* cited by examiner

VIDEO CONTENT SEARCH USING CAPTIONING DATA

PRIORITY CLAIM

This application claims priority from, and is a continuation of, U.S. patent application Ser. No. 14/061,172, filed Oct. 23, 2013, which is incorporated herein by reference in its entirety.

FIELD OF THE DISCLOSURE

The present disclosure is generally related to video content search.

BACKGROUND

A digital video recorder (DVR) is an electronic device used to record videos (e.g., television programming, movies, etc.) that a user device (e.g., a set-top box) receives from a content provider. When a DVR records a program, the DVR may also record captioning data associated with the program. The user may watch the DVR recordings at a later time. When the user wants to watch videos containing particular topics of interest from the DVR recordings, the user may manually search through some of the DVR recordings (e.g., the user may watch at least a portion of each of the DVR recordings) until one or more videos containing the particular topics of interest are found.

DETAILED DESCRIPTION

Systems and methods of identifying videos containing content of interest are disclosed. The described techniques may enable a user to identify content of interest using captioning data (e.g., closed captioning data, open captioning data, and/or subtitle data) and contextual information of video content, such as recordings stored at a digital video recorder (DVR) and video on demand (VOD). Segments of the video content that contain the content of interest may be presented to the user in an order of relevance. Thus, the time needed for a user to identify a relevant video segment may be reduced as compared to the user manually searching through the video content available to the user.

A captioning data analysis server may extract captioning data of video content that is available to users. The captioning data analysis server may analyze the captioning data to identify particular captioning data that matches one or more context sensitive terms associated with the video content. For example, the one or more context sensitive terms may be received from one or more content providers. To illustrate, the captioning data analysis server may identify the context sensitive terms based on electronic programming guide (EPG) data. The captioning data analysis server may identify one or more segments of the video content that are associated with particular captioning data.

The captioning data analysis server may use a set of factors to determine contextual information of the one or more segments. The set of factors may include a presentation format of particular video content, particular phrases in the captioning data, qualifying words in proximity (e.g., within 5 words) to a word in the captioning data that matches the context sensitive term, disqualifying words in proximity to the word in the captioning data that matches the context sensitive term, elapsed time of the particular video content, a segment viewing frequency, words associated with the context sensitive term, or a combination thereof.

Based on the contextual information, the captioning data analysis server may determine whether the one or more segments of the video content contain content of interest. The captioning data analysis server may store (e.g., in a database) a corresponding searchable tag associated with each segment that is determined to contain the content of interest. The captioning data analysis server may also assign a corresponding relevancy score to each searchable tag based on the context information.

A search server may receive a search request from a user device to locate particular segment(s) of video content that match one or more keywords or phrases in the search request. The search server may access the database to search the searchable tags. The search server may generate a search result list including searchable tags that match the one or more keywords or phrases. In a particular embodiment, the search result list includes a single search tag that has the highest relevancy score. In another particular embodiment, searchable tags are displayed in the search result list in order of relevancy score. For example, the content search server may list a first searchable tag with the highest relevancy score (among searchable tags that match the one or more keywords or phrases) as a first search result in the search result list. The content search server may list a second searchable tag with the second highest relevancy score as a second search result that follows the first search result.

When a selection of a particular searchable tag in the search result list is received, an advertisement may be displayed prior to displaying a particular segment corresponding to the particular searchable tag. During the display of the advertisement, trick play functionality (e.g., fast forwarding, pausing, rewinding, skip forwarding, skip backwarding, or a combination thereof) may be disabled. The trick play functionality may be enabled after the advertisement finishes playing.

In a particular embodiment, a method includes identifying, at a computing device, multiple segments of video content based on a context sensitive term. Each segment of the multiple segments is associated with captioning data of the video content. The method also includes determining, at the computing device, contextual information of a first segment of the multiple segments based on a set of factors. The method further includes comparing first contextual information to particular contextual information that corresponds to content of interest. The method further includes, in response to a determination that the first contextual information matches the particular contextual information, storing a first searchable tag associated with the first segment in a database.

In a particular embodiment, an apparatus includes a processor and a memory coupled to the processor. The memory includes instructions that, when executed by the processor, cause the processor to perform operations that include identifying, at a computing device, multiple segments of video content based on a context sensitive term. Each segment of the multiple segments is associated with captioning data of the video content. The operations also include determining, at the computing device, contextual information of a first segment of the multiple segments based on a set of factors. The operations further include comparing the first contextual information to particular contextual information that corresponds to content of interest. The operations further include, in response to a determination that the first contextual information matches the particular contextual information, storing a first searchable tag associated with the first segment.

In a particular embodiment, a computer readable storage device stores instructions that, when executed by a processor, cause the processor to perform operations that include identifying, at a computing device, multiple segments of video content based on a context sensitive term. Each segment of the multiple segments is associated with captioning data of the video content. The operations also include determining, at the computing device, contextual information of a first segment of the multiple segments based on a set of factors. The operations further include comparing the first contextual information to particular contextual information that corresponds to content of interest. The operations further include, in response to a determination that the first contextual information matches the particular contextual information, storing a first searchable tag associated with the first segment.

Thus, systems and methods described herein may enable a user to identify segments, presented in an order of relevance, that contain content of interest to the user based on captioning data. For example, a system may determine that contextual information of content of interest to a user corresponds to musical performances of a particular singer based on user input and other information. When the user searches for video content of the particular singer, the system may identify and present to the user segments of video content that correspond to musical performances of the particular singer. Thus, the time needed for the user to identify a relevant video segment may be reduced as compared to the user manually searching through the video content available to the user.

Figure 1:
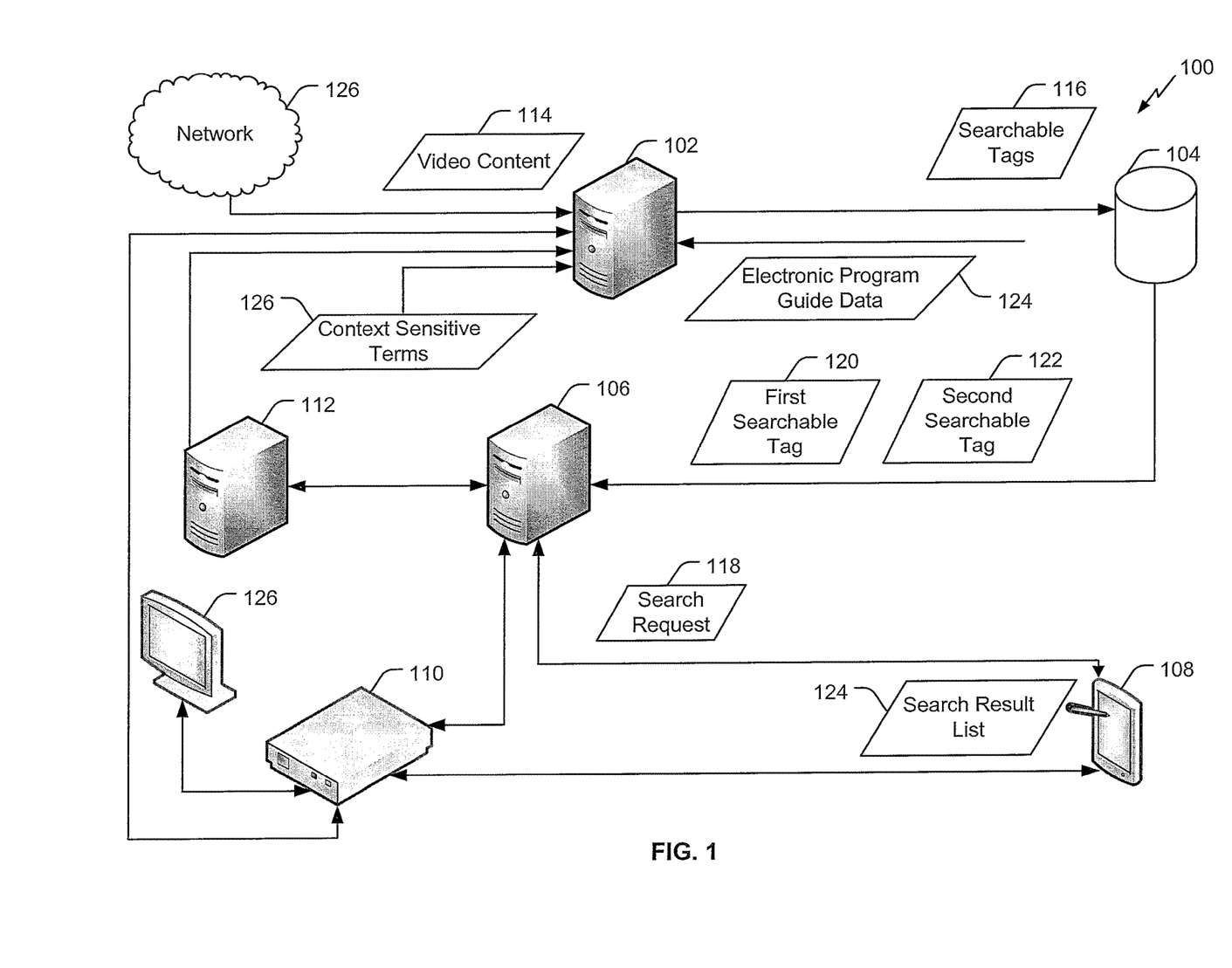
FIG. 1 is a diagram illustrating a particular embodiment of a system that identifies content of interest based on captioning data.

Referring to FIG. 1, a particular embodiment of a system 100 that is operable to identify content of interest based on captioning data is illustrated. The system 100 includes a captioning data analysis server 102, a searchable tag database 104, a search analysis server 106, and a user device 108. The user device 108 may include a tablet computer, a smartphone, a laptop computer, a personal digital assistant (PDA) device, or other computing device. In a particular embodiment, the captioning data analysis server 102 and the search analysis server 106 are incorporated as a single entity (e.g., a single server).

During operation, the captioning data analysis server 102 may receive video content 114 from a plurality of sources, such as a remote storage server 112 of a first video content provider, a remote storage server of a second video content provider (not shown), etc. The captioning data analysis server 102 may receive the video content 114 via a network 126 (e.g., an Internet protocol television network, a wireless network, a wired network, etc.). The captioning data analysis server 102 may extract captioning data of the video content 114. For example, when the captioning data is hardcoded into the video content 114, the captioning data analysis server 102 may extract the captioning data via an optical character recognition process. As another example, the captioning data may be transmitted to the captioning data analysis server 102 as a data stream or packets that are separate from the video content 114. The captioning data may include closed captioning data, open captioning data, and/or subtitle data.

The captioning data analysis server 102 may analyze the captioning data to generate searchable tags 116 to be stored in the searchable tag database 104. For example, the captioning data analysis server 102 may identify particular captioning data that matches one or more context sensitive terms associated with the video content 114. The captioning data analysis server 102 may generate the one or more context sensitive terms based on electronic programming guide (EPG) data 124 that is received from a content provider. In addition or alternatively, the captioning data analysis server 102 may receive the one or more context sensitive terms (e.g., context sensitive terms 126) from one or more content providers. In a particular embodiment, the captioning data analysis server 102 accesses different sources that contain video content available to the user to generate the one or more context sensitive terms. For example, the captioning data analysis server 102 may access a first video stored in a digital video recorder (DVR) 110 to generate the one or more context sensitive terms. The captioning data analysis server 102 may also access a second video stored in a remote storage server 112 to generate the one or more context sensitive terms. In a particular embodiment, the captioning data analysis server 102 concurrently accesses the DVR 110 and the remote storage server 112. The one or more context sensitive terms may correspond to information that is of interest to a user. For example, one or more context sensitive terms may include a name of a person, a name of a musical album, a name of a sports team, a brand name, a product name, etc.

The captioning data analysis server 102 may generate searchable tags that are specific to the video content 114 based on metadata (e.g., dates, types of video content, etc.) of the video content 114. For example, when the captioning data analysis server 102 identifies the video content 114 as news broadcasting using the metadata, the captioning data analysis server 102 may apply a particular tagging scheme (e.g., a news tagging scheme) to generate searchable tags associated with the video content 114. The captioning data analysis server 102 may use certain types of phrases, indicators, etc. that are specific to news broadcasting to generate searchable tags associated with news broadcasting (and the news tagging scheme). The captioning data analysis server 102 may also label searchable tags based on types (e.g., news broadcast, sporting broadcast, talk shows, etc.) of video content, so that when a user searches for content of a certain type (e.g., news broadcast, sporting broadcast, talk shows, etc.), the search analysis server 106 may identify video segments corresponding to searchable tags that match the type of content.

To generate searchable tags, the captioning data analysis server 102 may identify segments of the video content 114 that contain the particular captioning data corresponding to the content of interest based on the one or more context sensitive terms. For example, a first context sensitive term identified based on EPG data of a talk show may be "singer X" and three segments of the video content 114, where the video content 114 corresponds to a late night talk show, may contain captioning data that matches the first context sensitive term "singer X". Captioning data of a first segment of the three segments may be "tonight, our guests include singer X, singer Y, and singer Z." Captioning data of a second segment of the three segments may be "singer X will be performing her latest hit song later on in the show." Captioning data of a third segment of the three segments may be "ladies and gentlemen, singer X is going to perform her latest hit song now." The captioning data analysis server 102 may determine contextual information related to each of the three segments to identify segments that include content of interest. For example, the captioning data analysis server 102 may generate the contextual information as text strings. The context sensitive terms may vary based on types (e.g., news broadcast, sporting broadcast, talk shows, etc.) of video content. For example, video content associated with a talk show may have different context sensitive terms than video content associated with a sporting event. Context sensitive terms for a talk show may be names of guests (e.g., "singer X"), album names, etc. Context sensitive terms for a sporting event may be "touchdown," "slam dunk," etc.

To determine whether a segment includes content of interest, the captioning data analysis server 102 may compare contextual information of the segment to particular contextual information of a particular segment having the content of interest. For example, the particular contextual information may correspond to a performance of singer X. When the captioning data analysis server 102 determines that the contextual information of the segment corresponds to merely a mention of singer X during a conversation, the data analysis server 102 may determine that the contextual information does not match the particular contextual information. Thus, the data analysis server 102 may determine that the segment does not contain content of interest. However, when the captioning data analysis server 102 determines that the contextual information of the segment matches the particular contextual information of the particular segment (e.g., the contextual information of the segment corresponds to a performance of singer X), the data analysis server 102 may determine that the segment contains content of interest.

As used herein, contextual information of a segment "matches" the particular contextual information when a text string corresponding to the contextual information is determined to match a text string corresponding to the particular contextual information using language analysis (e.g., fuzzy logic). For example, a text string corresponding to contextual information of content of interest may be "performance by singer X" and "singer X" may be a search keyword. The data analysis server 102 may identify four segments (e.g., a first segment, a second segment, a third segment, and a fourth segment) that contain captioning data matching the search keyword "singer X". A first text string corresponding to contextual information of the first segment may be "performance by singer X." A second text string corresponding to contextual information of the second segment may be "singer X performing." A third text sting corresponding to contextual information of the third segment may be "singer X singing." A fourth text string corresponding to contextual information of the fourth segment may be "singer X interview."

The contextual information of the first segment matches the contextual information of content of interest because the first text string matches the text string of the contextual information of content interest verbatim. The contextual information of the second segment matches the contextual information of content of interest because the language analysis/fuzzy logic may determine that "performing" is equivalent to "performance". In a particular embodiment, equivalence may be determined using a lookup table stored at the data analysis server 102. The contextual information of the third segment matches the contextual information of content of interest because the language analysis/fuzzy logic may determine that "singing" is a synonym of "performance." In a particular embodiment, synonyms may be determined using the lookup table. The contextual information of the fourth segment does not match the contextual information of content of interest because the language analysis/fuzzy logic may determine that "interview" is not equivalent to "performance" nor is a synonym of "performance." Determination of contextual information of a segment is described in further detail below.

In an embodiment, the captioning data analysis server 102 determines contextual information corresponding to content of interest based on feedback from one or more users of video content during a training sequence. As an example, during the training sequence, the captioning data analysis server 102 may provide to one or more users a plurality of segments from the video content 114 or from other video content (e.g., a plurality of episodes of the same talk show) and may request the users to indicate which segments include certain content of interest. The captioning data analysis server 102 may receive selections of first particular segments that the one or more users indicate contain the content of interest. The captioning data analysis server 102 may also receive selections of second particular segments that the one or more users indicate as not containing the content of interest.

During the training sequence, the captioning data analysis server 102 may determine individualized contextual information that corresponds to the content of interest for each type of the video content 114. As an example, the captioning data analysis server 102 may provide a plurality of segments from a first video (e.g., a talk show) to the one or more users to determine first contextual information of the first video that corresponds to the content of interest. The first contextual information may be specific to the first video. The captioning data analysis server 102 may also provide a plurality of segments from a second video (e.g., a movie) to the one or more users to determine second contextual information of the second video that corresponds to the content of interest. The second contextual information may be specific to the second video. The first contextual information may be different than the second contextual information.

The captioning data analysis server 102 may analyze selected segments (e.g., segments that correspond to the content of interest and segments that do not correspond to the content of interest) to generate a set of factors that are used to determine contextual information of segments of the video content 114. The set of factors may be descriptive of a user preference for content of interest. For example, the captioning data analysis server 102 may use recurring common words or phrases in proximity to context sensitive terms in the selected segments to generate the set of factors. As an example, the captioning data analysis server 102 may analyze captioning data of multiple segments that contain a particular context sensitive term to identify words or phrases, in proximity (e.g., within 5 words) to the particular context sensitive term, that appear whenever the context sensitive term appears. For example, in the case of musical performances, such phrases may include "performing now" or "please welcome." The captioning data analysis server 102 may also use elapsed time of the particular segments (e.g., twenty minutes into a show) to generate the set of factors. For example, musical performances may be determined to occur at least 20 minutes into a talk show. The captioning data analysis server 102 may use other information of the particular segments to generate the set of factors. Additional factors to determine content of interest are described in further detail herein.

When the captioning data analysis server 102 has identified segments of the video content 114 corresponding to content of interest based on the set of factors, the captioning data analysis server 102 may generate a searchable tag corresponding to each of the identified segments and store the searchable tags in the searchable tag database 104. For example, the captioning data analysis server 102 may determine that a first segment and a second segment of video content correspond to the content of interest and that a third segment does not contain the content of interest (e.g., the third segment does not satisfy any of the set of factors). The captioning data analysis server 102 may store a first searchable tag associated with the first segment and a second searchable tag associated with the second segment in the searchable tag database 104.

Since the third segment does not correspond to the content of interest, the third segment may not be associated with a searchable tag. Instead, the captioning data analysis server 102 may store an identification of the third segment to a second database for subsequent use. The captioning data analysis server 102 may also store identifications of the first segment and the second segment to the second database. For example, during a subsequent training sequence, the captioning data analysis server 102 may determine that the first segment and the third segment correspond to the content of interest based on user feedback and that the second segment does not correspond to the content of interest because the user's preference for content of interest has changed. In this case, the captioning data analysis server 102 may remove the second searchable tag from the searchable tag database 104 and store a third searchable tag associated with the third segment in the searchable tag database 104.

The captioning data analysis server 102 may compute and assign a corresponding relevancy score to each searchable tag based on the set of factors. The captioning data analysis server 102 may compute the corresponding relevancy score by summing a corresponding weight of each of the set of factors that apply to the segment. For example, a segment viewing frequency factor may have a weight of 0.5 and a qualifying words factor may have a weight of 0.2. When a segment has the highest segment viewing frequency and captioning data of the segment includes qualifying words, a relevancy score of a searchable tag associated with the segment may be 0.7. When another segment has captioning data that includes qualifying words but does not have the highest segment viewing frequency, a relevancy score of a searchable tag associated with the other segment may be 0.2. The captioning data analysis server 102 may adjust weights during subsequent training sequences (e.g., based on user feedback or based on an algorithm update).

The searchable tag database 104 may store searchable tags associated with video content available to a user (e.g., the video content 114, recorded video content stored locally in the DVR 110, etc.). The searchable tag database 104 may store particular searchable tags that are associated with a single video. Each searchable tag may include a corresponding context sensitive term (e.g., "singer X"), a time index associated with a corresponding segment (e.g., an offset time that indicates the beginning of the corresponding segment in a video), a segment identification, one or more associations, a corresponding relevancy score, a classification label, aging factor (e.g., half life), or a combination thereof. For example, a first searchable tag may include the context sensitive term "singer X," a time index of 00:17-00:25, a segment identification of "talk show A," "music" and "female singer" as associations, a relevancy score of 0.9, and/or a classification label "entertainment". A second searchable tag may include the context sensitive term "president Y," a time index of 00:01-00:04, a segment identification of "news show B," a relevancy score of 0.3, and/or a classification label "news." A relevancy score of a searchable tag may be used by the search analysis server 106 to generate relevant search results. The relevancy score may be adjusted based on an associated aging factor. An aging factor may vary based on a classification label of a searchable tag. For example, a searchable tag associated with news content may lose relevancy much more quickly than a searchable tag associated with entertainment content. As an example, a first particular searchable tag associated with news content has a relevancy score of 0.9 when the first particular searchable tag is initially generated, the relevancy score of the first particular searchable tag may be 0.1 after 7 days due to the aging factor. As another example, a second particular searchable tag associated with entertainment content may have a relevancy score of 0.9 when the second particular searchable tag is generated initially, the relevancy score of the second particular searchable tag may be 0.8 after 7 days due to the aging factor.

In a particular embodiment, the searchable tag database 104 is updated periodically (e.g., every day, every 30 minutes, etc.). Alternatively, the searchable tag database 104 may be updated whenever the captioning data analysis server 102 receives (or detects) new video content. In a particular embodiment, the searchable tag database 104 is generated as soon as the data analysis server 102 receives the video content 114. In another particular embodiment, the searchable tag database 104 is generated upon receipt of a search request from the user device 108.

When a user searches for particular content of interest, the user device 108 may present two search options to the user. A first search option may be an assisted search and a second search option may be a manual search. When the user selects the assisted search option, the user may search for the particular content of interest by communicating with the search analysis server 106 via the user device 108. For example, the user may enter information associated with particular content of interest into a content search application running on the user device 108. The user device 108 may transmit a search request 118, generated by the content search application, to the search analysis server 106. The search request 118 may include one or more search keywords that the user entered or selected to indicate the particular content of interest. Based on the search request 118, the search analysis server 106 may search a subset of searchable tags in the searchable tag database 104 to identify one or more particular searchable tags associated with segments of the video content that correspond to the particular content of interest.

The subset of searchable tags may be associated with a subset of the video content 114 that is accessible to the user. The search analysis server 106 may identify the subset of video content accessible to the user based on user account information associated with the user device 108 or the user. For example, the subset of video content may include recordings of video content stored locally in the DVR 110, recordings of video content stored remotely (e.g., networked DVR recordings), video on demand (e.g., stored in the remote storage server 112), other user accessible video content, or any combination thereof. The DVR 110 may be part of a set-top box device that incorporates DVR functionality.

The search analysis server 106 may compare the one or more search keywords to corresponding context sensitive terms and corresponding associations (e.g., a first association generated based on the context sensitive term of the first searchable tag 120 and a second association generated based on the context sensitive term of the second searchable tag 122) to identify the one or more particular searchable tags. For example, an association of the context sensitive term "singer X" may be "jazz musician". As another example, an association of a context sensitive term "basketball" may be "sport." When the one or more search keywords match a corresponding context sensitive term and/or a corresponding association in a searchable tag (e.g., the first searchable tag 120 and/or the second searchable tag 122), the search analysis server 106 may determine that the searchable tag corresponds to the particular content of interest. For example, the search analysis server 106 may determine that a first searchable tag 120 and a second searchable tag 122 correspond to the particular content of interest. The search analysis server 106 may generate a search result list 124 based on the first searchable tag 120 and/or the second searchable tag 122 and transmit the search result list 124 to the user device 108. The search result list 124 is further described with reference to FIG. 2.

When the user selects one of the searchable tags listed in the search result list 124 via an input device (e.g., a keyboard or a touch screen) of the user device 108, the search analysis server 106 may receive the selection from the user device 108 and direct an advertisement to be displayed at a display device (e.g., a television 126 or a display of the user device 108) prior to playback of a segment associated with the selected searchable tag. For example, the selected segment may be a segment of a recorded video stored in the DVR 110 connected to the television 126. The search analysis server 106 may transmit the advertisement to the DVR 110 and direct the DVR 110 to display the advertisement via the television 126 prior to displaying the selected segment at the television 126. The search analysis server 106 may receive the advertisement from an advertisement server (not shown in FIG. 1).

During the display of the advertisement, trick play functionality (e.g., fast forwarding, pausing, rewinding, skip forwarding, and/or skip backwarding) may be disabled. For example, the search analysis server 106 may transmit a first command to the DVR 110 to instruct the DVR 110 to refrain from responding to commands from a remote control of the DVR 110 regarding the trick play functionality during the display of the advertisement. The trick play functionality may be enabled after the advertisement is completed (e.g., the first command or a second subsequent command may instruct the DVR 110 to be responsive to commands from the remote control regarding the trick play functionality after the advertisement is completed). After the display of the advertisement, the selected segment may begin playback at the beginning of the selected segment. For example, the selected segment may start at the 03:00 mark of a video. The selected segment may be displayed starting playback at the 03:00 mark of the video instead of starting at 00:00 (i.e., the beginning of the video).

When the user selects the manual search option, the user device 108 may present a list of video content that is available to the user and the user may manually search through the list of video content (e.g., by watching each of the video content items on the list) to identify the particular content of interest. During the manual search, an advertisement may not be displayed prior to playback of the video content and trick-play functionality may remain enabled.

As described in FIG. 1, the captioning data analysis server 102 may determine contextual information of segments of the video content 114 using a set of factors. The set of factors may include a presentation format, particular phrases in the captioning data, qualifying words in proximity to a word in the captioning data that matches the context sensitive term, disqualifying words in proximity to the word in the captioning data that matches the context sensitive term, elapsed time of segments, segment viewing frequency, words associated with the context sensitive term, or a combination thereof.

In an example where the set of factors includes a presentation format, the video content 114 may include a talk show that follows a presentation format having three portions: introduction segment, guest conversation segment, and guest performance segment. When captioning data matching the context sensitive term "singer X" is identified to be in the introduction segment of the talk show, the captioning data analysis server 102 may determine that contextual information of the introduction segment corresponds to mentioning of singer X, but that the introduction segment may not contain content of interest to a user (e.g., a performance by the singer X). When a particular segment is identified to be in the guest performance segment, the captioning data analysis server 102 may determine that the context of the particular segment corresponds to a performance of singer X and is of interest to the user.

In an example where the set of factors includes particular phrases in the captioning data, a talk show host may also utter the same phrases in each episode. The same phrases may be used to determine context associated with segments where the same phrases are found in the captioning data. As an example, the talk show host may say a particular phrase "now it is time for a guest performance" prior to performance of musical guests of the talk show. When captioning data of the particular segment is subsequent to captioning data corresponding to the particular phrase, the captioning data analysis server 102 may determine that the context of the particular segment corresponds to performance of singer X and that the particular segment may contain the content of interest. When the captioning data of the particular segment is prior to the captioning data corresponding to the particular phrase, the captioning data analysis server 102 may determine that the context of the particular segment does not correspond to performance of singer X.

As another example, the context sensitive term may be "touchdown." A sports show host may say a particular phrase "let us review today's touchdown highlights" in every episode prior to showing clips of touchdowns in different football games. When the captioning data of the particular segment is subsequent to captioning data corresponding to the particular phrase, the captioning data analysis server 102 may determine that the context of the particular segment corresponds to showing of touchdown clips.

In an example where the set of factors includes qualifying words in proximity to a word in the captioning data that matches the context sensitive term, the captioning data analysis server 102 may analyze ten words that are prior to the context sensitive term "singer X" and ten words that are subsequent to "singer X" in each segment to determine the contextual information of the three segments. For example, the particular context that corresponds to the content of interest may be performance of singer X. When particular words that indicate that singer X is about to perform a song, the particular words may be qualifying words. Words such as "performing now" or "welcome . . . to perform . . . new song" in proximity of "singer X" may indicate that the performance of singer X is about to begin. Thus, a segment corresponding to captioning data containing the qualifying words may indicate that the segment may contain the content of interest. It should be understood that the particular proximity may correspond to any number of words prior to and/or subsequent to the context sensitive term.

In an example where the set of factors includes disqualifying words in proximity to the word in the captioning data that matches the context sensitive term, the captioning data analysis server 102 may analyze twenty words that are prior to the context sensitive term "singer X" and twenty words that are subsequent to "singer X" in each segment to determine the context of the three segments. For example, when the particular words that indicate that singer X is not about to perform a song, the particular words may be disqualifying words. Words such as "perform . . . later on," "perform . . . in our next segment," or "perform . . . following singer A's performance" in proximity of "singer X" may indicate that the performance of singer X is not about to begin. Thus, a segment corresponding to captioning data containing the disqualifying words may indicate that the segment may not contain the content of interest. It should be understood that the particular proximity may correspond to any number of words prior to and/or subsequent to the context sensitive term.

In an example where the set of factors includes elapsed time of segments, when elapsed time of a particular segment (e.g., the first segment) matches a particular elapsed time that is generated using feedback from the one or more users, the captioning data analysis server 102 may determine that the particular segment may contain the content of interest. For example, during the training sequence, a first segment of a talk show that a user has indicated as containing content of interest may have a time index of 05:00 (e.g., the segment begins 5 minutes after the beginning of the talk show). During a search for content of interest, a second segment containing captioning data that matches a search keyword and that has a time index of 05:00 may be identified as containing content of interest based at least partially on the time index of the second segment matching the time index of the first segment.

In an example where the set of factors includes segment viewing frequency, the captioning data analysis server 102 may compare the number of times that each of the three segments has been viewed. The captioning data analysis server 102 may determine that the particular segment with the highest number of views (as compared to the other two segments) contains the content of interest. The captioning data analysis server 102 may receive information on the segment viewing frequency from an external source (e.g., a server of a content provider).

In an example where the set of factors includes words associated with the context sensitive term, the words of the context sensitive term "singer X" may include album names of singer X, song names of singer X, concert names of singer X, other work of singer X, etc. Based on the set of factors, the captioning data analysis server 102 may determine corresponding contextual information of the three segments. For example, based on the set of factors, the captioning data analysis server 102 may determine that contextual information of the first segment and the second segment corresponds to mentioning of singer X, and that contextual information of the third segment corresponds to a performance by singer X.

Thus, the system 100 may enable a user to identify content of interest using captioning data and contextual information of video content that is available to the user. Thus, time needed for a user to identify relevant segments may be reduced as compared to the user identifying the relevant segments manually.

Figure 2:
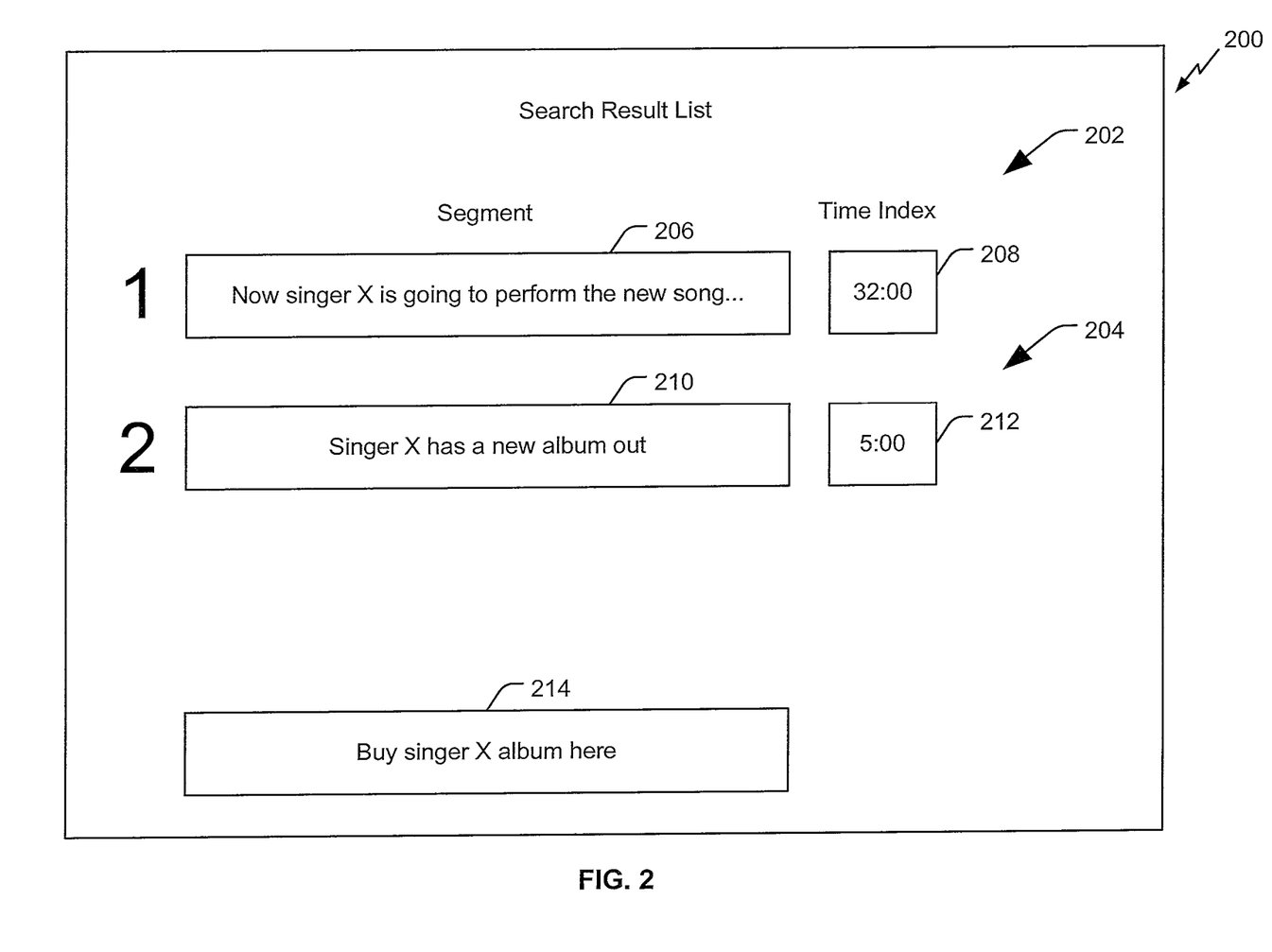
FIG. 2 is a diagram illustrating a particular embodiment of a search result page that displays one or more segments containing content of interest based on a search of captioning data.

FIG. 2 illustrates a particular embodiment of a search result page 200 that displays one or more segments containing the content of interest based on a search of the captioning data. The search result page 200 displays one or more search results that match the content of interest. For example, the search result page 200 includes a first search result 202 and a second search result 204. The first search result 202 may be generated based on the first searchable tag 120 of FIG. 1. The second search result 204 may be generated based on the second searchable tag 122 of FIG. 1.

The search results 202 and 204 may be ranked based on a relevancy score of a corresponding searchable tag. For example, when the first relevancy score of the first searchable tag 120 is greater than the second relevancy score of the second searchable tag 122, the first search result 202 may be listed as a first (e.g., top) item in the search result page 200 and the second search result 204 may be listed as a second (e.g., lower) item in the search result page 200 that follows the first item. In a particular embodiment, the search result page 200 only includes one search result (e.g., only the first search result 202 or the second search result 204) that corresponds to a searchable tag having the highest relevancy score among all the searchable tags that correspond to the content of interest. Each search result may include a plurality of portions. For example, the first search result 202 may include a first segment portion 206 and a first time index portion 208. The first segment portion 206 may display captioning data associated with the first searchable tag 120. The first time index portion 208 may display a time index associated with the first searchable tag 120 (e.g., a time at which a segment associated with the first searchable tag begins in a video). The second search result 204 may include a second segment portion 210 and a second time index portion 212. The second segment portion 210 may display captioning data associated with the second searchable tag 122. The second time index portion 212 may display a time index associated with the second searchable tag 122. The search result page 200 may also include an advertisement portion 214. The advertisement portion 214 may display an advertisement that is generated based on at least one of the search results 202 and 204. The advertisement may also be generated based on one or more search keywords in the search request.

Figure 3:
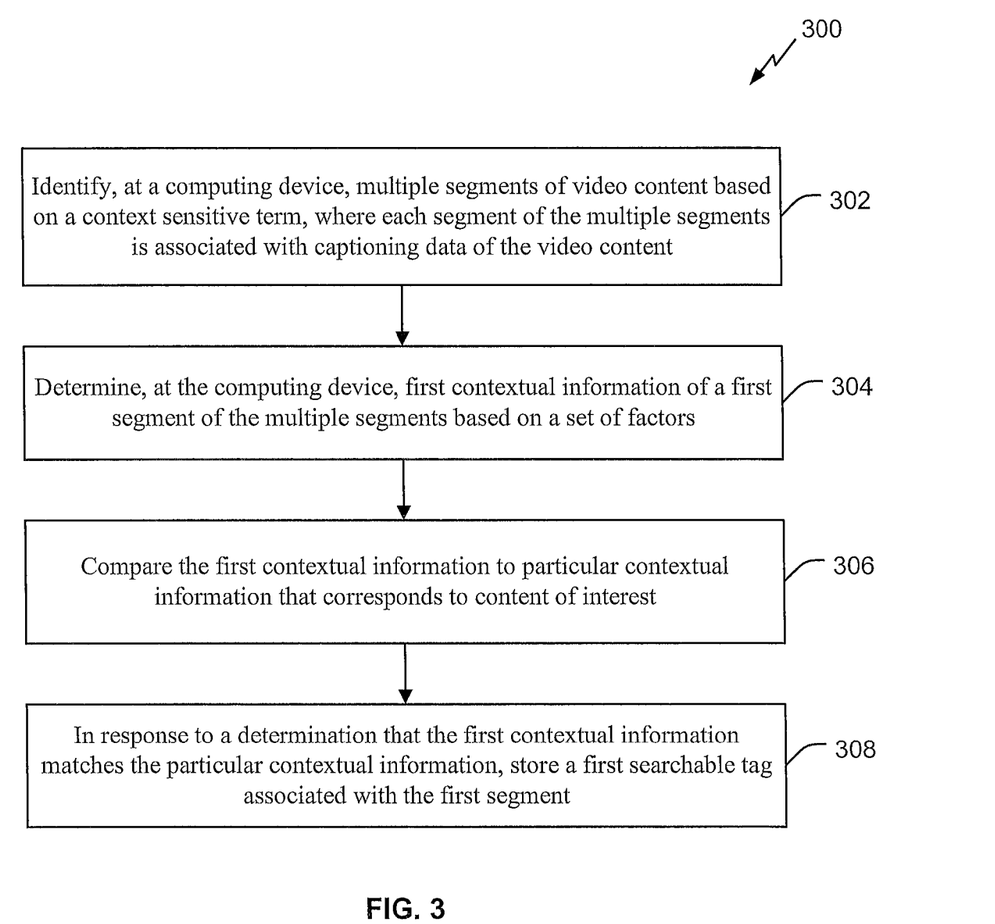
FIG. 3 is a flowchart illustrating a particular embodiment of a method of identifying content of interest.

FIG. 3 illustrates a particular embodiment of a method 300 of identifying content of interest. The method 300 includes identifying, at a computing device, multiple segments of video content based on a context sensitive term, at 302. Each segment of the multiple segments is associated with captioning data of the video content. For example, referring to FIG. 1, the captioning data analysis server 102 may identify segments of the video content 114 containing captioning data that matches the first context sensitive term "singer X."

The method 300 also includes determining, at the computing device, contextual information of a first segment of the multiple segments based on a set of factors, at 304. Referring to FIG. 1, in an example where the set of factors include a presentation format, when a particular segment is identified to be in the guest performance segment, the captioning data analysis server 102 may determine that the context of the particular segment corresponds to a performance of singer X, and is thus of interest to the user (i.e., the particular segment is or includes content of interest).

The method 300 further includes comparing the first contextual information to particular contextual information that corresponds to content of interest, at 306. For example, referring to FIG. 1, the particular contextual information of content of interest may correspond to a performance of singer X. When the captioning data analysis server 102 determines that the contextual information of the segment corresponds to merely a mention of singer X during a conversation, the data analysis server 102 may determine that the segment does not contain content of interest. However, when the captioning data analysis server 102 determines that the contextual information of the segment corresponds to a performance of singer X, the data analysis server 102 may determine that the segment contains content of interest.

The method 300 further includes, in response to a determination that the first contextual information matches the particular contextual information, storing a first searchable tag associated with the first segment, at 308. For example, referring to FIG. 1, when the captioning data analysis server 102 has identified segments of the video content 114 corresponding to the content of interest based on the set of factors, the captioning data analysis server 102 may generate a searchable tag (e.g., the searchable tag 116) corresponding to each of the identified segments and store the searchable tags in the searchable tag database 104. As an example, the first searchable tag may include the context sensitive term "singer X," a time index of 00:17-00:25, a segment identification of "talk show A," "music" and "female singer" as associations, and a relevancy score of 0.9.

In alternate embodiments, the method 300 may include more, fewer, or different steps. For example, the method 300 may include storing a second searchable tag associated with a second segment of the multiple segments in the database. For example, referring to FIG. 1, the captioning data analysis server 102 may store the second searchable tag associated with the second segment in the searchable tag database 104. The method 300 further includes assigning a first relevancy score to the first segment based on a set of factors. For example, referring to FIG. 1, the captioning data analysis server 102 may compute and assign a corresponding relevancy score to each searchable tag based on the set of factors.

The method 300 may include assigning a second relevancy score to the second segment based on the set of factors. For example, referring to FIG. 1, the captioning data analysis server 102 may compute and assign a corresponding relevancy score to each searchable tag based on the set of factors. The method 300 may further include storing a third identification of a third segment of the multiple segments, where the third identification is not associated with a searchable tag based on a second determination that the third segment does not include the content of interest. For example, referring to FIG. 1, since the third segment does not correspond to the content of interest, the third segment may not be associated with a searchable tag. Instead, the captioning data analysis server 102 may store an identification of the third segment to a second database for subsequent use.

The method 300 may include receiving a search request from a user device. For example, referring to FIG. 1, the user device 108 may transmit the search request 118, generated by the content search application, to the search analysis server 106. The method 300 further includes comparing a search keyword of the search request to the first searchable tag and the second searchable tag. For example, referring to FIG. 1, when the one or more search keywords matches a corresponding context sensitive term and/or a corresponding association in a searchable tag (e.g., the first searchable tag 120 and/or the second searchable tag 122), the search analysis server 106 may determine that the searchable tag corresponds to the particular content of interest.

When the first relevancy score is greater than the second relevancy score, the method 300 may include providing a first indication of the first segment to the user device as a first item in a search result list and not providing a second indication of the second segment as a second item in the search result list that follows the first item. When the second relevancy score is greater than the first relevancy score, the method 300 may include providing the second indication to the user device as the first item in the search result list, where the first indication is provided as the second item in the search result list. For example, referring to FIG. 2, when the first relevancy score of the first searchable tag 120 is greater than the second relevancy score of the second searchable tag 122, the first search result 202 may be listed as a first item in the search result page 200 and the second search result 204 may be listed as a second item in the search result page 200 that follows the first item. As another example, when the second relevancy score is greater than the first relevancy score, the second search result 204 may be listed as the first item and the first search result 202 may be listed as the second item.

When the first relevancy score is greater than the second relevancy score, the method 300 may include providing a first indication of the first segment to the user device, where a second indication of the second segment is not provided to the user device. When the second relevancy score is greater than the first relevancy score, the method 300 may include providing the second indication to the user device, and not providing the first indication to the user device. For example, referring to FIG. 2, the search result page 200 may be shown on a display of the user device 108 and may only include a single search result (e.g., only the first search result 202 or the second search result 204) that corresponds to a searchable tag having the highest relevancy score among all the searchable tags that correspond to the content of interest.

The method 300 may include generating a first association based on the first searchable tag and generating a second association based on the second searchable tag, where comparing the search keyword to the first searchable tag and the second searchable tag includes comparing the search keyword to a first context sensitive term of the first searchable tag, to a second context sensitive term of the second searchable tag, to the first association, and to the second association. For example, referring to FIG. 1, the search analysis server 106 may compare the one or more search keywords to corresponding context sensitive terms and corresponding associations (e.g., the first association generated based on the context sensitive term of the first searchable tag 120 and the second association generated based on the context sensitive term of the second searchable tag 122) to identify the one or more particular searchable tags.

When the first segment is accessed without receiving a search request from a user device, the method 300 may include displaying the first segment without displaying an advertisement. For example, referring to FIG. 1, when the selected segment is accessed without performing a search on the search analysis server 106 (e.g., no search request is received at the search analysis server 106), the advertisement may not be displayed. When the search request containing a keyword that matches a portion of the first searchable tag is received from the user device, the method 300 may include displaying the advertisement at a display device prior to playback of the first segment at the display device, where trick play functionality of the advertisement is disabled, and where the trick play functionality of the first segment is enabled after the advertisement is displayed. For example, referring to FIG. 1, when the user selects one of the searchable tags listed in the search result list 124 via an input device of the user device 108, the search analysis server 106 may receive the selection from the user device 108 and direct an advertisement to be displayed at a display device (e.g., a television 126 or a display of the user device 108) prior to playback of a segment associated with the selected searchable tag at the display device. During the display of the advertisement, trick play functionality (e.g., fast forwarding, pausing, rewinding, skip forwarding, and/or skip backwarding) may be disabled. The trick play functionality may be enabled after the display of the advertisement. Thus, the method 300 may enable a user to identify the content of interest using captioning data and contextual information of video content that is available to the user. Thus, time needed for a user to identify relevant segments may be reduced as compared to the user identifying relevant segments manually.

Figure 4:
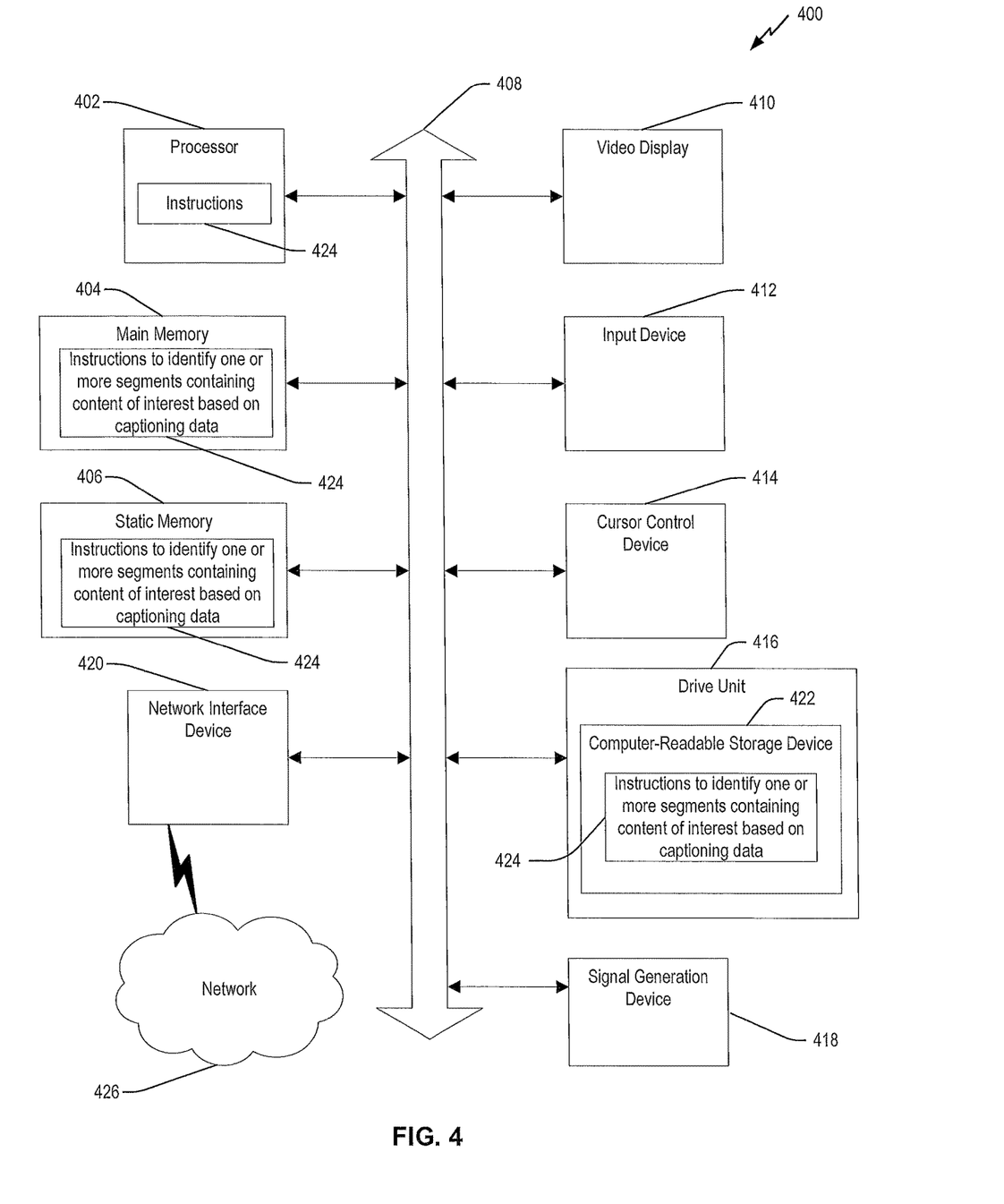
FIG. 4 is a block diagram of an illustrative embodiment of a general computer system including components that are operable to identify content of interest based on captioning data.

FIG. 4 illustrates a particular embodiment of a general computer system 400 including components that are operable to identify content of interest based on captioning data. The general computer system 400 may include a set of instructions that can be executed to cause the general computer system 400 to perform any one or more of the methods or computer based functions disclosed herein. The general computer system 400 may operate as a standalone device or may be connected, e.g., using a network, to other computer systems or peripheral devices. For example, the general computer system 400 may include, be included within, or correspond to one or more of the components of the system 100, the captioning data analysis server 102 of FIG. 1, the search analysis server 106, or a combination thereof described with reference to FIG. 1.

In a networked deployment, the general computer system 400 may operate in the capacity of a server or as a client user computer in a server-client user network environment, or as a peer computer system in a peer-to-peer (or distributed) network enviromnent. The general computer system 400 may also be implemented as or incorporated into various devices, such as a personal computer (PC), a tablet PC, a STB, a personal digital assistant (PDA), a customer premises equipment device, an endpoint device, a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the general computer system 400 may be implemented using electronic devices that provide video, audio, or data communication. Further, while one general computer system 400 is illustrated, the term "system" shall also be taken to include any collection of systems or sub-systems that individually or jointly execute a set, or multiple sets, of instructions to perform one or more computer functions.

As illustrated in FIG. 4, the general computer system 400 includes a processor 402, e.g., a central processing unit (CPU), a graphics processing unit (GPU), or both. The processor 402 may be one or more components (e.g., a processor) of the captioning data analysis server 102, one or more components (e.g., a processor) of the search analysis server 106, one or more components operable to identify content of interest using captioning data, or a combination thereof. Moreover, the general computer system 400 may include a main memory 404 and a static memory 406, which can communicate with each other via a bus 408. For example, the main memory 404 may be one or more components (e.g., a memory) of the captioning data analysis server 102, one or more components (e.g., a memory) of the search analysis server 106, one or more components operable to store data, or a combination thereof. As shown, the general computer system 400 may further include a video display unit 410, such as a liquid crystal display (LCD), a flat panel display, a solid state display, or a lamp assembly of a projection system. Additionally, the general computer system 400 may include an input device 412, such as a keyboard, and a cursor control device 414, such as a mouse. The general computer system 400 may also include a drive unit 416, a signal generation device 418, such as a speaker or remote control, and a network interface device 420. The general computer system 400 may not include an input device (e.g., a server may not include an input device).

In a particular embodiment, as depicted in FIG. 4, the drive unit 416 may include a computer-readable storage device 422 in which one or more sets of instructions 424, e.g. software, can be embedded. The computer-readable storage device 422 may be random access memory (RAM), read-only memory (ROM), programmable read-only memory (PROM), erasable PROM (EPROM), electrically erasable PROM (EEPROM), register(s), hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or processor. The computer-readable storage device is not a signal. Further, the instructions 424 may embody one or more of the methods or logic as described herein. The instructions 424 may be executable by the processor 402 to perform one or more functions or methods described herein, such as the method described with reference to FIG. 3. In a particular embodiment, the instructions 424 may reside completely, or at least partially, within the main memory 404, the static memory 406, and/or within the processor 402 during execution by the general computer system 400. The main memory 404 and the processor 402 also may include a computer-readable storage device.

In an alternative embodiment, dedicated hardware implementations, such as application specific integrated circuits, programmable logic arrays and other hardware devices, may be constructed to implement one or more of the methods described herein. Various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations may include distributed processing, component/object distributed processing, and parallel processing. Alternatively, virtual computer system processing may be constructed to implement one or more of the methods or functionality as described herein.

The present disclosure contemplates a tangible computer-readable storage device 422 that stores the instructions 424 or receives, stores, and executes the instructions 424, so that a device connected to a network 426 may communicate voice, video or data over the network 426. For example, the tangible computer-readable storage device 422 device may include or be included within one or more of the components of the captioning data analysis server 102, one or more components of the search analysis server 106, one or more devices operable to identify content of interest using captioning data, or a combination thereof described with reference to FIG. 1. While the tangible computer-readable storage device 422 is shown to be a single device, the tangible computer-readable storage device 422 may include a single medium or multiple media, such as a centralized or distributed database, and/or associated caches and servers that store one or more sets of instructions. The tangible computer-readable storage device 422 is capable of storing a set of instructions for execution by a processor to cause a computer system to perform any one or more of the methods or operations disclosed herein.

In a particular non-limiting, exemplary embodiment, the tangible computer-readable storage device 422 may include a solid-state memory such as a memory card or other package that houses one or more non-volatile read-only memories. Further, the tangible computer-readable storage device 422 may be a random access memory or other volatile re-writable memory. Additionally, the tangible computer-readable storage device 422 may include a magneto-optical or optical medium, such as a disk or tapes or other storage device. Accordingly, the disclosure is considered to include any one or more of a tangible computer-readable storage device and other equivalents and successor devices, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at an analysis server from a user device, a keyword associated with content of interest;
   receiving, at the analysis server from a database, searchable tag data for first searchable tags from a set of searchable tags in the database, each searchable tag of the set of searchable tags corresponding to a segment of stored media content, the stored media content associated with the user device and including captioning data, wherein the first searchable tags pertain to the keyword, wherein the searchable tag data includes an initial relevancy score and a corresponding aging factor for each first searchable tag of the first searchable tags, wherein the initial relevancy score for each first searchable tag is based on a set of factors, and wherein the set of factors includes a segment viewing frequency factor of the segment of stored media content and a qualifying words factor associated with qualifying words located within a threshold count of words to a word in the captioning data that corresponds to a context sensitive term in relation to the keyword;
   generating, at the analysis server, a list of media content segments available to the user device based on the searchable tag data, the list ordered based on the initial relevancy scores modified by the corresponding aging factors; and
   sending the list from the analysis server to the user device.

2. The method of claim 1, further comprising
   receiving, at the analysis server from the user device, selection data indicating a user selection of a particular entry of the list of media content segments; and
   sending a first content to a media device associated with the user device, wherein the first content is displayed by a display device coupled to the media device before the analysis server enables the media device to initiate playback of a segment of media content that corresponds to the particular entry.

3. The method of claim 2, further comprising disabling trick play functionality of the media device during display of the first content.

4. The method of claim 3, further comprising causing the media device to playback the segment of the media content after completion of display of the first content.

5. The method of claim 2, wherein the first content comprises an advertisement.

6. The method of claim 2, wherein the media device is a different device than the user device.

7. The method of claim 2, wherein the stored media content associated with the user device includes media content stored at a local digital video recorder associated with the media device.

8. The method of claim 1, wherein the stored media content associated with the user device includes media content stored by a network recorder.

9. The method of claim 1, wherein each searchable tag includes a time index for the segment, an identifier of a program, a keyword, an association word based on the keyword, a content category, or combinations thereof.

10. A system comprising:
a processor; and
a memory coupled to the processor, wherein the memory includes instructions that, when executed by the processor, cause the processor to perform operations, the operations including:
receiving, from a user device, a keyword associated with content of interest;
retrieving, from a database, searchable tag data for first searchable tags from a set of searchable tags in the database, each searchable tag of the set of searchable tags corresponding to a segment of stored media content, the stored media content associated with the user device and including captioning data, wherein the first searchable tags pertain to the keyword, wherein the searchable tag data includes an initial relevancy score and a corresponding aging factor for each first searchable tag of the first searchable tags, wherein the initial relevancy score for each first searchable tag is based on a set of factors, and wherein the set of factors includes a segment viewing frequency factor of the segment of stored media content and a qualifying words factor associated with qualifying words located within a threshold count of words to a word in the captioning data that corresponds to a context sensitive term in relation to the keyword;
generating a list of media content segments available to the user device based on the searchable tag data, the list ordered based on the initial relevancy scores modified by the corresponding aging factors; and
sending the list to the user device.

11. The system of claim 10, wherein the operations further include:
receiving, from the user device, selection data indicating a user selection of a particular entry of the list of media content segments; and
causing a media device associated with the user device to playback a segment of media content corresponding to the particular entry.

12. The system of claim 11, wherein the stored media content associated with the user device includes media content recorded by a network recording device and saved at a remote storage location, second media content stored by a digital video recorder device associated with the media device, or both.

13. The system of claim 11, wherein the operations further include causing the media device to playback first content before the playback of the segment, wherein fast forwarding, skip forwarding, or both, are disabled during the playback of the first content.

14. The system of claim 11, wherein the user device comprises a portable computer device.

15. A computer-readable hardware device storing instructions that, when executed by a processor, cause the processor to perform operations, the operations comprising:
receiving, from a user device, a keyword associated with content of interest;
retrieving, from a database, searchable tag data for first searchable tags from a set of searchable tags in the database, each searchable tag of the set of searchable tags corresponding to a segment of stored media content, the stored media content associated with the user device and including captioning data, wherein the first searchable tags pertain to the keyword, wherein the searchable tag data includes an initial relevancy score and a corresponding aging factor for each first searchable tag of the first searchable tags, wherein the initial relevancy score for each first searchable tag is based on a set of factors, and wherein the set of factors includes a segment viewing frequency factor of the segment of stored media content and a qualifying words factor associated with qualifying words located within a threshold count of words to a word in the captioning data that corresponds to a context sensitive term in relation to the keyword;
generating a list of media content segments available to the user device based on the searchable tag data, the list ordered based on the initial relevancy scores modified by the corresponding aging factors; and
sending the list to the user device.

16. The computer-readable hardware device of claim 15, wherein the operations further comprise:
receiving, from the user device, selection data indication a user selection of a particular entry of the list of media content segments; and
causing a media device associated with the user device to playback a segment of media content corresponding to the particular entry.

17. The computer-readable hardware device of claim 16, wherein the operations further comprise:
causing the media device to playback first content prior to the playback of the segment of media content corresponding to the particular entry, wherein the first content comprises an advertisement; and
causing the media device to disable trick play functionality during playback of the first content.

18. The computer-readable hardware device of claim 17, wherein the operations further comprise causing the media device to disable trick play functionality during playback of the first content.

19. The computer-readable hardware device of claim 15, wherein the set of factors includes a presentation format factor regarding a presentation format of the stored media content and a disqualifying words factor associated with disqualifying words located within a second threshold count of words to the word in the captioning data.

20. The computer-readable hardware device of claim 15, wherein the sending of the list causes the user device to display a search result page, and wherein the search result page includes an advertisement portion that displays an advertisement that is generated based on the media content segments included in the list and the keyword.

* * * * *